United States Patent [19]

Wilson

[11] Patent Number: 4,846,899
[45] Date of Patent: Jul. 11, 1989

[54] NITRIDE DISPERSION-STRENGTHENED STEELS AND METHOD OF MAKING

[75] Inventor: Andrew M. Wilson, Fulwood, United Kingdom

[73] Assignee: United Kingdom Atomic Energy Authority, London, United Kingdom

[21] Appl. No.: 67,299

[22] Filed: Jun. 29, 1987

[30] Foreign Application Priority Data

Jul. 7, 1986 [GB] United Kingdom ................ 8616519

[51] Int. Cl.$^4$ .............................................. C23C 8/26
[52] U.S. Cl. ................................. 148/16.6; 148/318; 420/68; 75/251
[58] Field of Search ....................... 148/16.6, 318, 326, 148/328; 75/251, 252; 376/906, 457; 420/68

[56] References Cited

U.S. PATENT DOCUMENTS 3,512,960  5/1970  Brady .................................. 148/326
4,047,981  9/1977  Arnold et al. ....................... 148/16
4,582,679  4/1986  Wilson et al. ...................... 148/318

FOREIGN PATENT DOCUMENTS 008228    2/1980  European Pat. Off. .
1464217   2/1977  United Kingdom .
2156863  10/1985  United Kingdom .

OTHER PUBLICATIONS

Huet et al., "Dispersion-Strengthen Ferritic Steels as Fast-Reactor Structural Material," Nuclear Technology, vol. 24, Nov. 1974, pp. 216-224.

*Primary Examiner*—Deborah Yee
*Attorney, Agent, or Firm*—William R. Hinds

[57] ABSTRACT

A low carbon steel has a composition which is ferritic, martensitic or ferritic: martensitic at temperatures of the order of 700° C. and substantially fully austenitic at temperatures in excess of 1000° C. and nitriding of a refractory stable metal nitride former, e.g. titanium, of the alloy is effected while the alloy is in its substantially fully austenitic state so as to produce a fine and homogeneous dispersion of the nitride and thereby enhance the creep strength of the alloy when in its ferritic, martensitic or ferritic: martensitic state.

19 Claims, No Drawings

# NITRIDE DISPERSION-STRENGTHENED STEELS AND METHOD OF MAKING

The invention relates to nitride dispersion-strengthened steels and, in particular, ferritic and ferritic: martensitic and martensitic steels for use as fuel pin cladding materials in liquid metal cooled fast nuetron reactors.

The fuel pins in a fast reactor are designed as pressure vessels which must withstand the stresses from the release of fission gas products without developing excessive strain. Typically, a maximum clad temperature of the order of 670°-700° C. can be expected and end of life pressures are of the order of 2,000 lb/in$^2$. Fuel cladding alloys must therefore have good high temperature creep strength so that high burn-up targets, for example 15% or greater, can be attained without incurring the capital cost penalties associated with the use of long gas plena. As the pins are exposed to a high fast neutron flux the cladding must also show good resistance to neutron-induced void swelling.

12% Cr ferritic: martensitic steels are considered to be attractive candidate alloys because of their low susceptibility to void swelling but, in their conventional hardened and tempered condition, they do not have sufficient high temperature creep strength for use as cladding for high burn-up fuel pins at 700° C.

The Applicants have attempted to improve the creep strength of 12% Cr ferritic: martensitic steels by incorporation of a nitride former, specifically titanium, in the steel composition followed by gas phase nitriding at temperatures of the order of 1050°-1200° C. to produce a titanium nitride dispersion throughout the steel; it being already known that gas phase nitriding of austenitic 20%Cr/25%Ni/Ti produces a fine dispersion of TiN which enhances the creep strength of the alloy significantly. However, these attempts surprisingly did not significantly enhance the creep strength of 12% Cr ferritic: martensitic steel and the lack of success in this respect is attributed, by the Applicants, to the fact that the resulting dispersoid is too coarse to have any significant strengthening affect.

An object of the present invention is therefore the provision of a steel composition which, after nitriding, will emulate the low neutron-induced void swelling characteristics of 12% Cr ferritic: martensitic steels while affording exhanced creep strength at high temperatures, ie. of the order of 700° C.

According to one aspect of the invention there is provided a method of producing a nitride dispersion-strengthened low carbon steel comprising producing an alloy composition whose constituents include a nitride former and are present in quantities such that the alloy is ferritic, martensitic or ferritic: martensitic at temperatures below 750° C. and is substantially fully austenitic at temperatures in excess of 1000° C., and effecting nitriding of the alloy, preferably with the alloy in powder form, at a temperature in excess of 1000° C. so that the nitride former is precipitated as a nitride within a substantially fully austenitic matrix, the nitrided alloy thereafter converting to the ferritic, martensitic or ferritic: martensitic form on cooling.

The carbon content is preferably less than 0.02 wt% to ensure that the titanium content is not depleted by significant precipitation of titanium carbide.

The chromium content is preferably at least 9 wt% and not more than 12 wt%, preferably not more than 10 wt%.

Where the nitride former is titanium, it is preferably present in an amount between 1.0 and 2.5 wt%.

The nickel content of the alloy preferably lies within the range 0.5-3.5 wt% and more preferably 1.5-2.5 wt%.

Thus, the invention resides in effecting nitriding of the alloy while it is in substantially fully austenitic from with a view to securing precipitation of a homogeneous fine dispersion of for example titanium nitride which will significantly enhance the creep strength of the alloy at high temperature when the alloy reverts to its ferritic, martensitic or ferritic: martensitic form. In addition nitriding is carried out at a temperature in excess of 1000° C. (preferably at least 1050° C.) to avoid the formation of chromium nitrides which would otherwise have to be removed by a subsequent high temperature treatment with the risk of undesirable pore formation.

When the alloy obtained by the above method is used as cladding for fast reactor fuel pins, it will be in the ferritic, martensitic or ferritic: martensitic form since the in-service temperatures are typically less than 700° C. and, on prolonged exposure to high temperature, ie 350°-750° C. the martensite present (if any) will tend to convert gradually to the ferrite form.

According to a further aspect of the invention there is provided a nitrided low carbon ferritic, martensitic or ferritic: martensitic steel alloy produced by the above-defined method having a chromium content of at least 9 wt% and incorporating a refractory stable metal nitride, such as titanium nitride, finely and homogeneously dispersed therein so as to enhance significantly the creep strength of the alloy when compared with a nitride-free form of the alloy.

The titanium, chromium, nickel and carbon contents may be as defined above.

The alloy may be in the form of stock strip, sheet or tube material or it may be in powder form for subsequent consolidation by conventional power metallurgy techniques.

Nitriding of the alloy may be effected by gas phase nitriding, ie. in an atmosphere of predominantly nitrogen (possibly with some hydrogen present, eg. 95%N$_2$/5%H$_2$) and the nitriding temperature is preferably in the range of 1100°-1200° C. to ensure that chromium nitride formation in avoided. After nitriding, the alloy may be degassed in purified hydrogen.

It is envisaged that nitriding may be effected by other techniques; for example by the technique disclosed in our prior British Patent Application No. 2183676A which involves producing the alloy by mechanical alloying of its constituents together with the nitride former, eg titanium, and a nitrogen donor which will dissociate at elevated temperature, eg. a nitride of chromium.

In practice, the determination of the composition of an alloy in accordance with the invention, ie. one which is substantially fully austenitic at temperatures in excess of 1000° C. and ferritic, martensitic or ferritic: martensitic up to 750° C., may be carried out by phase stability calculations. Two presently preferred alloy compositions are as follows:

Alloy I: carbon 0.012; chromium 9.2; molybdenum 0.61; silicon 0.42; titanium 1.97; nickel 1.03; manganese 0.77; balance iron.

Alloy II: carbon 0.017; chromium 9.2; molybdenum 0.58; silicon 0.44; titanium 1.46; nickel 2.56; manganese 0.77; balance iron (all figures expressed as wt%).

I claim:

1. A method of producing a nitride dispersion-strengthened low carbon steel comprising producing an alloy composition whose constituents include a nitride former and are present in quantities such that the alloy is ferritic, martensitic or ferritic: martensitic at temperatures below 750° C. and is substantially fully austenitic at temperatures in excess of 1000° C., and effecting nitriding of the alloy at a temperature in excess of 1000° C. so that the nitride former is precipitated as a nitride within a substantially fully austenitic matrix, the nitrided alloy thereafter converting to the ferritic, martensitic or ferritic: martensitic form on cooling.

2. A method as claimed in claim 1 in which the nitride former is titanium.

3. A method as claimed in claim 2 in which the titanium, when present as the nitride former, is present in an amount between 1.0 to 2.5 wt %.

4. A method as claimed in claim 1 in which the carbon content is less than 0.02 wt %.

5. A method as claimed in claim 1 in which the chromium content is in the range of 9 wt % to 12 wt %.

6. A method as claimed in claim 5 in which the chromium content does not exceed 10 wt%.

7. A method as claimed in claim 1 containing nickel in an amount of 0.5 to 3.5 wt %.

8. A method as claimed in claim 7 in which the nickel content is 1.5 to 2.5 wt%.

9. A nitrided low carbon ferritic, martensitic or ferritic: martensitic steel alloy produced by the method of claim 1 having a chromium content of at least 9 wt% but not exceeding 10 wt% and incorporating a refractory stable metal nitride finely and homogeneously dispersed therein so as to enhance significantly the creep strength of the alloy when compared with a nitride-free form of the alloy.

10. An alloy as claimed in claim 9 in which the nitride former is titanium.

11. An alloy as claimed in claim 10 in which the titanium is present in an amount of 1.0 to 2.5 wt %.

12. An alloy as claimed in claim 9 in which the carbon content is less than 0.02 wt %.

13. An alloy as claimed in claim 9 containing 0.5 to 3.5 wt % nickel.

14. An alloy as claimed in claim 13 containing 1.5 to 2.5 wt % nickel.

15. An alloy having the composition of carbon 0.012; chromium 9.2; molybdenum 0.61; silicon 0.42; titanium 1.97; nickel 1.03; manganese 0.77; balance iron (all figures expressed as wt%).

16. An alloy having the composition: carbon 0.017; chromium 9.2; molybdenum 0.58; silicon 0.44; titanium 1.46; nickel 2.56; manganese 0.77; balance iron (all figures expressed as wt%).

17. An alloy as claimed in claim 9 in the form of stock strip, sheet or tube material.

18. An alloy as claimed in claim 9 in the form of powder material for consolidation by powder metallurgy techniques.

19. A nuclear fuel element having a cladding composed of an alloy as claimed in claim 9.

* * * * *

UNITED STATES PATENT AND TRADEMARK OFFICE
CERTIFICATE OF CORRECTION

PATENT NO. : 4,846,899

DATED : July 11, 1989

INVENTOR(S) : ANDREW MARK WILSON

It is certified that error appears in the above—identified patent and that said Letters Patent is hereby corrected as shown below:

On the first page of the patent, the information page, under the heading "References Cited," the following U. S. patents are added to the list under the heading "U.S. PATENT DOCUMENTS":

| | | | |
|---|---|---|---|
| 3,373,015 | 3/1968 | Allen et al | 420/42 |
| 4,011,133 | 3/1977 | Bloom et al | 376/457 |
| 4,234,385 | 11/1980 | Ozaki et al | 376/457 |

Signed and Sealed this

Thirteenth Day of November, 1990

Attest:

HARRY F. MANBECK, JR.

*Attesting Officer*  *Commissioner of Patents and Trademarks*